T. HOOCK.
ELECTRICALLY HEATED APPARATUS.
APPLICATION FILED OCT. 23, 1912.
1,146,330.
Patented July 13, 1915.
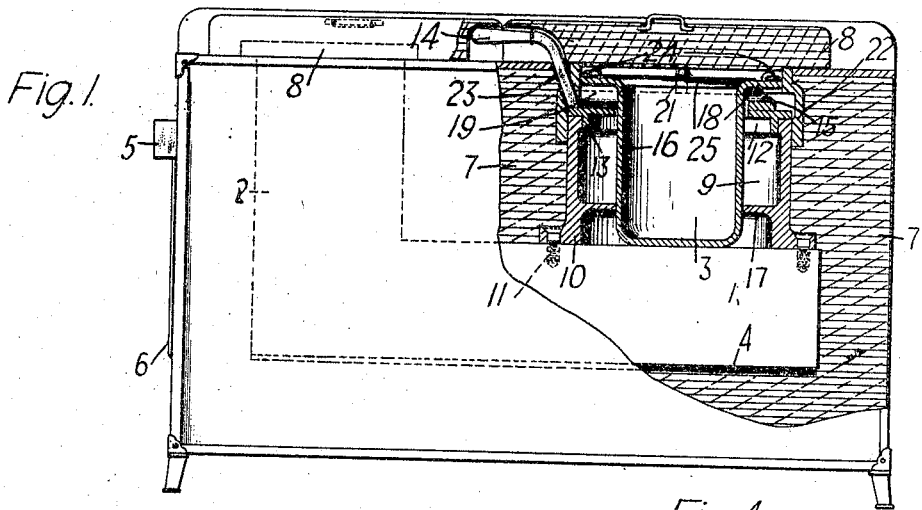
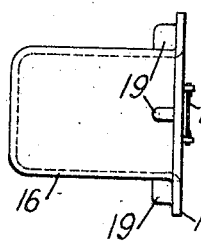
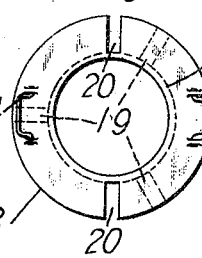
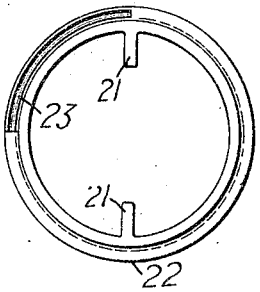
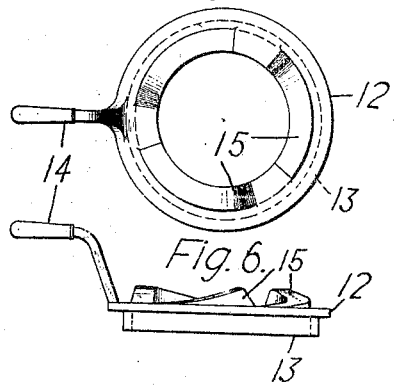
WITNESSES:
INVENTOR
Theodor Hoock
BY
ATTORNEY

UNITED STATES PATENT OFFICE.

THEODORE HOOCK, OF COLOGNE, BAYENTHAL, GERMANY, ASSIGNOR TO WESTINGHOUSE ELECTRIC AND MANUFACTURING COMPANY, A CORPORATION OF PENNSYLVANIA.

ELECTRICALLY-HEATED APPARATUS.

1,146,330.   Specification of Letters Patent.   Patented July 13, 1915.

Application filed October 23, 1912. Serial No. 727,298.

*To all whom it may concern:*

Be it known that I, THEODORE HOOCK, a subject of the Emperor of Germany, and a resident of Cologne, Bayenthal, Germany, have invented a new and useful Improvement in Electrically-Heated Apparatus, of which the following is a specification.

My invention relates to electrically heated apparatus and it has special reference to cooking stoves or ranges of the so-called "heat-storage" type having masses of material for accumulating or storing heat that may be electrically supplied thereto at a low and substantially constant rate, whereby the heat thus accumulated is available for cooking operations at any desired time.

One of the objects of my invention is to simplify and improve the construction and operation of devices of the above indicated character and to provide a cooking apparatus of great utility that may be operated economically for a variety of operations by reason of the high efficiency which is obtained through the peculiar construction of the apparatus.

Another object of my invention is to provide a device of this general class which shall embody a cooking vessel or receptacle that is disposed within an opening in one of the walls of heat-insulating material which envelops the heat-storage mass and prevents loss of heat by radiation, said vessel being normally adapted to rest upon the heat-storage body and being provided with ready means for adjusting its position.

My invention may best be understood by reference to the accompanying drawings, in which—

Figure 1 is a view, partially in front elevation and partially in section, of a cooking device embodying my invention, and Figs. 2 to 6, inclusive, are detail views of some of the parts shown in Fig. 1.

Referring to the drawing, the apparatus shown comprises a mass or body 1 of cast iron or other suitable material that is adapted to store or accumulate heat, one end of said body being provided with an upwardly projecting hot plate 2, while the other end is provided with an adjustable cooking utensil 3. An electric heater 4 is disposed directly beneath the bottom of the heat-storage body 1 and in intimate contact therewith, and, inasmuch as this heater pertains only indirectly to my present invention, its construction may be of any well known type. A terminal box 5 is provided on the exterior of the range for purposes of connection to a suitable source of energy (not shown) and, connecting said box with the electric heater 4, are a plurality of leads 6.

Walls of heat-insulating material 7 are disposed around the heat-storage body 1 and its integrally associated hot plate 2, as well as the cooking utensil 3 and the heater 4 and thus serve to prevent the loss of heat from said parts by radiation. Disposed above the hot plate 2 and the cooking utensil 3 are removable members or pads 8 of heat insulating material, said pads occupying the positions shown when the apparatus is not in use, thereby causing practically all of the heat that is supplied to the heat-storage body 1 by the electric heater 4 to be stored therein for future use, as required.

The cooking utensil 3 is disposed within an opening 9 in the upper wall of heat-insulating material 7 and lies entirely below the upper surface of the range. The utensil referred to comprises an annular supporting structure 10 which is securely fastened to the heat-storage body 1 by screws 11, or other suitable means, and resting upon the upper surface of said structure 10, is a rotatable annular member 12 having a downwardly projecting annular flange 13 that is disposed within the supporting structure 10. The member 12 is provided with an upwardly projecting handle 14 by means of which said member may be moved to any desired position, as will be hereinafter more fully set forth. The upper surface of the annular member 12 is provided with a plurality of equally spaced inclined cam members 15.

A vessel or receptacle 16 is disposed within the annular member 12 and the supporting structure 10 to normally rest upon the heat storage body 1 and is maintained in substantially a central position by means of a flange 17 which constitutes a part of the supporting structure 10. The upper portion of the vessel 16 is provided with an outwardly projecting edge or flange 18 and, integrally associated therewith and downwardly projecting therefrom, are a plurality of equally spaced supporting members 19 which are severally adapted to rest upon and coöperate with the inclined cam members 15 hereinbefore mentioned.

The flange 18 of the vessel 16 is also provided with oppositely disposed slots or recesses 20 which are adapted to receive projecting members 21 of a ring member 22 that surrounds the vessel 16, the rotatable member 12 and the supporting structure 10. By reason of the coöperative engagement of the projecting members 21 with the edges of the slots 20, it is impossible to give a rotative movement to the vessel 16. One quadrant of the ring member 22 is provided with a curved slot or opening 23 through which the handle 14 of the rotatable member 12 projects, whereby movement thereof is permitted. The vessel 16 is provided with a plurality of conveniently located handles 24 and also with a removable cover 25.

Assuming the various parts to occupy the positions shown in Fig. 1, the vessel 16 is in intimate contact with the heat-storage body 1, and, hence, a free and ready flow of heat thereto is effected, whereby said vessel is maintained at its highest temperature. In case it is desired to reduce the heat supplied to the vessel, the handle 14 may be moved in a clockwise direction, thereby causing the member 12 to be rotated to raise the vessel 16 by reason of the coöperative engagement of the inclined cam members 15 with the several supporting members 19. Obviously, the distance which the vessel 16 is elevated from the heat storage body 1 depends upon the amount of rotative movement given to the handle 14, so that any desired air gap may be obtained between the bottom of the vessel and the storage body 1.

Manifestly, the greater the air gap between the parts just referred to, the less the amount of heat supplied to the vessel 16 and, by reason of the peculiar construction of the cooking utensil 3, any desired regulation of heat and temperature may be readily secured. Moreover, inasmuch as the vessel 16 is disposed within the opening 9 in the heat storage material 7 and entirely below the surface of the range, it is evident that the cooking operation may be economically performed by reason of the high efficiency of the apparatus under these conditions and the negligible amount of heat that is lost by radiation.

Many variations may be effected in the structure hereinbefore shown and described in detail, which will secure the benefits of my invention to a greater or less extent, and such modifications as do not depart from the spirit and scope of my invention I intend to cover in the appended claims.

I claim as my invention:

1. In a heating device, the combination with a body of heat-storage material, means for heating the same, and walls of heat-insulating material enveloping said parts, of a cooking utensil disposed in an opening in one of said heat-insulating walls and in proximity to said heat-storage body, and means for adjusting the position of said utensil with respect to said body to vary the amount of heat delivered to the said utensil.

2. In a heating device, the combination with a body of heat-storage material, means for heating the same, and walls of heat-insulating material enveloping said parts, one of said walls having an opening in proximity to said heat-storage body, of a cooking utensil disposed in said opening and normally adapted to rest upon said storage body, and adjustable mechanical means for raising said utensil above said body.

3. In a heating device, the combination with a body of heat-storage material, means for heating the same, and walls of heat-insulating material enveloping said parts, one of said walls being provided with an opening in proximity to said heat-storage body, of a cooking utensil disposed in said opening and adapted to rest upon said body, and mechanical means dependent upon the rotative movement thereof for adjusting the position of said utensil.

4. In a heating device, the combination with a body of heat-storage material, means for heating the same, and an envelop of heat-insulating material surrounding said parts, said envelop being provided with an opening in proximity to said body, of a cooking vessel disposed in said opening and normally resting upon said body, a movable member surrounding said vessel, and means associated therewith and coöperating with said vessel for adjusting the position thereof with respect to said body.

5. In a heating device, the combination with a heat-storage body, means for heating the same, and walls of heat-insulating material enveloping said parts, one of said walls being provided with an opening in proximity to said body, of a cooking utensil disposed in said opening and resting on said body and means embodying a plurality of cam members and dependent upon the rotative movement thereof for effecting changes in position of said vessel.

6. In a cooking utensil, the combination with a supporting structure and a vessel disposed therein, of means coöperating with said vessel and said structure and dependent upon rotative movement for causing relative vertical adjustments between said vessel and said structure.

7. In a cooking utensil, the combination with a supporting structure and a vessel disposed therein, of means interposed between said structure and said vessel for effecting adjustments in the position of said vessel and thereby varying the amount of heat received by the said utensil.

8. In a cooking utensil, the combination with a supporting structure and a vessel having an outwardly projecting upper edge disposed therein, of a rotatable member surrounding said vessel and disposed between said structure and the projecting edge of said vessel for effecting vertical adjustments thereof.

9. In a cooking utensil, the combination with a supporting structure and a vessel having an outwardly projecting upper edge disposed therein, of a plurality of downwardly projecting members associated with said projecting edge, a rotatable annular member surrounding said vessel and disposed between said supporting structure and said projecting edge, said member being provided with a plurality of cam members to coöperate with said downwardly projecting members, and means for preventing a rotative movement of said vessel.

10. In a heating device, the combination with a heat-storage body and heat-insulating material surrounding the same, of a cooking vessel disposed within said heat-insulating material and in proximity to said storage body, and mechanical means for regulating the heat supplied to said vessel.

11. In a heating device, the combination with a body of heat-storage material and heat-insulating material surrounding the same, of a cooking vessel disposed in proximity to said heat-storage body, and adjustable mechanical means for regulating the air gap between said vessel and said body, whereby variations in the amount of heat supplied thereto are effected.

In testimony whereof, I have hereunto subscribed my name this 5th day of August, 1912.

THEODORE HOOCK.

Witnesses:
 Louis Vandorn,
 Bessie F. Dunlap.